Patented Mar. 18, 1952

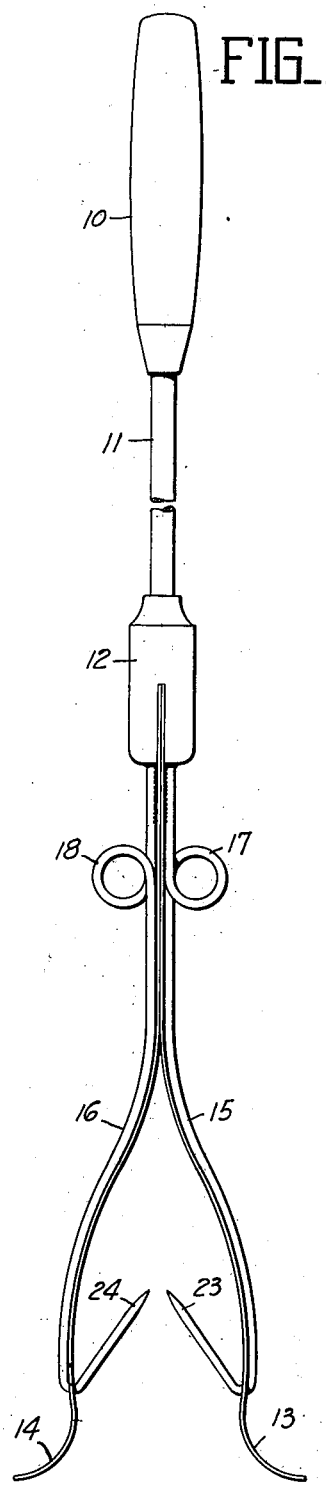
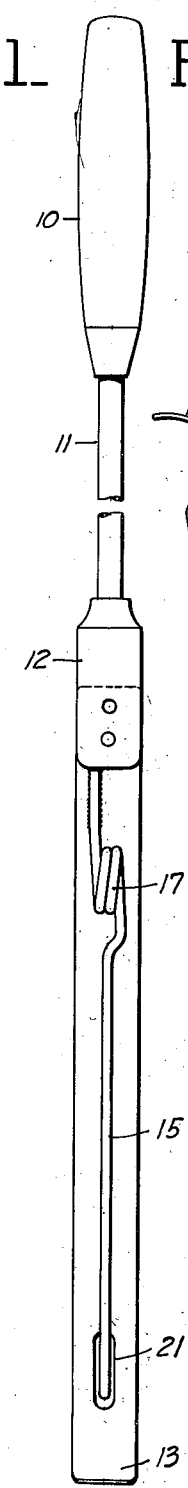
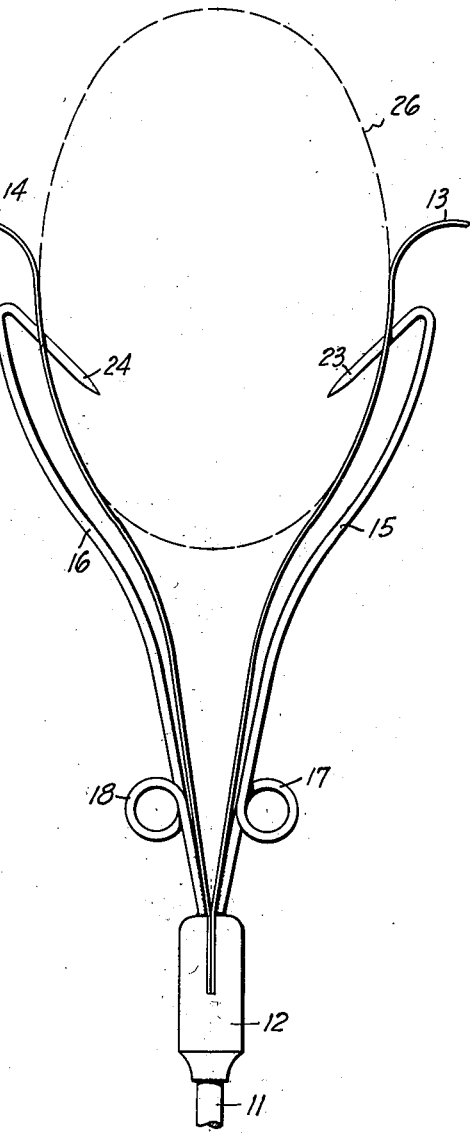

2,589,612

UNITED STATES PATENT OFFICE 2,589,612

FISH GAFF

Bert Lee Herrington, deceased, late of Klamath Falls, Oreg., by Lillie A. Herrington, administratrix, Klamath Falls, Oreg.

Application September 13, 1947, Serial No. 773,782

4 Claims. (Cl. 294—99)

This invention relates to gaffs used in landing fish after the same have been caught as by means of a hook and line.

It is an object of this invention to provide a gaff which will automatically gaff the fish when it is thrust into contact with the fish's body.

Another object of this invention is to provide a gaff in which the hooks or prong portions are enclosed between guard members to prevent accidental hooking or gaffing of the user.

Further objects and advantages of this invention will appear from the following specification taken in conjunction with the accompanying drawings in which:

Figure 1 is a side elevational view showing a gaff incorporating this invention, and Figure 2 is an end elevational view of the gaff showing this invention, and Figure 3 is a view of the gaff portion shown in Figure 1 in operation.

As shown in Figure 1 the gaff consists of a handle 10 at the upper end of a shaft 11 the lower end of which is provided with a butt member 12. Extending downwardly from the member 12 is a pair of identical and opposed yieldable guard members 13 and 14 which are preferably made of resilient spring steel and which are shaped substantially as shown to provide a space between them at their lower ends. Adjacent the guard members 13 and 14, as shown, are identical opposed hook members 15 and 16 which are suitably mounted in member 12 and which are likewise made of resilient material. The shanks of members 15 and 16 are coiled at 17 and 18 which further increases the resiliency of the members 15 and 16 and tends to urge them into closed or unsprung position.

Guard members 13 and 14 are provided with a pair of elongated orifices 21 and 22 through which the hook portions 23 and 24 of members 15 and 16 respectively project inwardly and toward each other, as shown. It will be noted that the members 13 and 14 are flat and may be formed of strap material and, as shown in Figure 2, they are substantially wider than the members 15 and 16. It will further be noted that the members 13 and 14 lie closely against the members 15 and 16 and that all of the members are close together. Thus the area between the members 13 and 14 is almost entirely bounded by the rather broad members 13 and 14. Because of their breadth members 13 and 14 therefore provide, in effect, a protective zone within which the hooks 23 and 24 lie.

In unsprung position, members 15 and 16 lie closely against members 13 and 14 substantially as shown in Figure 1. Those portions of members 13 and 14 below the orifices 21 and 22 are flared outwardly to provide an enlarged area between the guard members 13 and 14 in order to increase the effective mouth opening of the gaff.

When the gaff is thrust at an object 26, such as a fish, the same will pass between the flared ends of guard members 13 and 14 and, since the guard members are resilient, urge them apart. When the member 26 contacts the portions 23 and 24 of the hooks 15 and 16, they too will be urged apart and, as is shown, may be urged away from engagement with members 13 and 14 as shown in Figure 1. The orifices 21 and 22 are of such size that members 23 and 24 may be urged very nearly out of the orifices and out of contact with members 13 and 14, thereby increasing to the utmost the effective space between the guard members 13 and 14 and the hooks 23 and 24 to permit the entry of the fish into that space.

When the gaff has been thrust over a fish or other object 26 to be gaffed, a reverse pull on the handle 10 forces the hook portions of the members 15 and 16 into the body. This tends to hook the body 26 and retain the same. Further pull on handle 10 tends to force the hooks 23 and 24 further into the body.

The object 26 may be released from the gaff by moving it toward the member 12 in which event both the hooks 23 and 24 and the resilient members 13 and 14 will be urged apart. When the object 26 is free of the hooks it may be removed transversely of the gaff or one may grasp the flared out portions of members 13 and 14 and retain the same in their separated positions whereupon the body 26 may be withdrawn longitudinally of the gaff without further damage.

It is obvious that this gaff is unique in its operation and also provides substantial guard against its hooking or gaffing the user. The only way in which an object 26, either a fish, arm, leg, etc., may be engaged by this gaff is to pass between the guard members 13 and 14 at their flared opening. The guard members 13 and 14 and the hooks 23 and 24 must be positively forced apart before an object may be grasped between them. When this gaff is placed on the deck of a boat or on the floor of an automobile when it is being transported, a person may step upon the same or otherwise contact it without fear of being hooked or gaffed. He may only be hooked if the gaff is thrust over his arm or leg or some other portion of his body and the members 23 and 24 are positively separated by a pressure exerted on the handle or shaft of the gaff. The weight of the gaff by itself is not sufficient to urge the members 15 and 16 and the hook members 23 and 24 apart.

It is obvious that this is a positively acting gaff which is safe at all times and whose utility is not decreased by the addition of the safety features.

It is claimed:

1. In a fish gaff, a pair of normally spaced and yieldably mounted opposed gaffing hooks, a pair of yieldably mounted guard members each of which is provided with an orifice, the hook portions of said hooks projecting through said orifices.

2. In a fish gaff, a pair of spaced opposed gaffing hooks yieldably mounted in the same plane, each of the said hooks comprising a shank and a hook portion, a pair of yieldably mounted guard members, said guard members being mounted between the shanks of said hooks, and orifices in said guard members through which said hook portions project.

3. In a fish gaff, opposed gaffing hooks, yieldably mounted and urged together and lying in the same plane, each of said hooks comprising a shank and a hook portion, said hook portions being in the same plane and pointed toward each other, a pair of yieldably mounted guard members spaced apart, said guard members lying between the shanks of said hooks and provided with orifices which cooperate with said hook portions whereby said hook portions may project into the space between said guard members.

4. In a fish gaff, a plurality of yieldably mounted gaffing hooks normally urged together, each of said hooks comprising a shank and a hook portion, said hook portions being in the same plane and being pointed toward each other, a pair of slotted guard members being yieldably mounted and spaced apart, said guard members adapted to lie between the shanks of said hooks, the hook portions projecting through the slotted guard members into the space between said guard members and to be operated independently of said guard members.

LILLIE A. HERRINGTON,
*Administratrix of the Estate of Bert Lee Herrington, Deceased.*

REFERENCES CITED

The following references are of record in the file of this patent:

UNITED STATES PATENTS

| Number | Name | Date |
|---|---|---|
| 1,085,843 | Bemis | Feb. 3, 1914 |
| 1,206,733 | Sirard | Nov. 28, 1916 |
| 2,319,686 | Janisch | May 18, 1943 |